(12) United States Patent
Adamson

(10) Patent No.: US 11,338,938 B2
(45) Date of Patent: May 24, 2022

(54) AIRCRAFT CLOCK FACTORY

(71) Applicant: The Boeing Company, Chicago, IL (US)

(72) Inventor: Chad R. Adamson, Black Diamond, WA (US)

(73) Assignee: The Boeing Company, Chicago, IL (US)

( * ) Notice: Subject to any disclaimer, the term of this patent is extended or adjusted under 35 U.S.C. 154(b) by 54 days.

(21) Appl. No.: 16/734,773

(22) Filed: Jan. 6, 2020

(65) Prior Publication Data

US 2021/0206513 A1    Jul. 8, 2021

(51) Int. Cl.
  *B64F 5/10*     (2017.01)
  *B64F 5/50*     (2017.01)
  *B64C 25/16*    (2006.01)

(52) U.S. Cl.
  CPC .............. *B64F 5/10* (2017.01); *B64C 25/16* (2013.01); *B64F 5/50* (2017.01); *B23P 2700/01* (2013.01)

(58) Field of Classification Search
  CPC .... B64F 5/10; B64F 5/50; B64C 25/16; B23P 2700/01
  USPC .......................................................... 29/791
  See application file for complete search history.

(56) References Cited

U.S. PATENT DOCUMENTS

| | | | | |
|---|---|---|---|---|
| 9,061,773 | B2 * | 6/2015 | Bausen | B64F 5/10 |
| 2009/0056116 | A1 * | 3/2009 | Presley | B81C 99/002 29/791 |
| 2011/0010912 | A1 * | 1/2011 | Bausen | B64F 5/10 29/428 |
| 2013/0067721 | A1 * | 3/2013 | Scannon | E04H 5/02 29/527.1 |
| 2013/0126500 | A1 * | 5/2013 | Cruickshank | F16L 1/19 219/136 |
| 2018/0201237 | A1 * | 7/2018 | Wells | B65G 67/38 |
| 2020/0108949 | A1 * | 4/2020 | Watkins | B64C 1/26 |

\* cited by examiner

*Primary Examiner* — Lawrence Averick
(74) *Attorney, Agent, or Firm* — Quinn IP Law

(57) ABSTRACT

A factory for assembling aircraft or other systems includes a factory floor with multiple build stations. The factory floor includes a hub-and-spoke tool track having radial track sections connected to and extending radially from a circular center hub section. Each track section terminates at a respective build station. A mobile transport travels along the track to the build stations, transforms into different join tools at a predetermined build station, and thereafter engages and supports the components. An overhead crane may perform another task at each build station. The factory floor may include a first floor positioned below a smaller diameter second floor with ramps interconnecting the floors. A center tower is surrounded by the floor(s), with the center tower defining rooms. An aircraft may be assembled via a method using the above-noted factory.

24 Claims, 8 Drawing Sheets

AIRCRAFT CLOCK FACTORY

BACKGROUND

The present disclosure pertains to an improved factory for manufacturing aircraft or other relatively large and complex systems, as well as to associated methods for manufacturing such systems within the disclosed factory. While the term "manufacturing" as used herein primarily encompasses final assembly of the complex system from its main constituent components, and possibly some amount of assembly of the main components themselves, processes other than assembly may be performed within the disclosed factory, e.g., system-level and/or subcomponent-level testing. Therefore, "manufacturing" encompasses at least the described assembly processes, and possibly includes additional processes that would be beneficial to perform while the system resides within the factory.

An exemplary embodiment of the above-noted complex system is a fixed-wing aircraft. Such an aircraft is typically assembled from several major components, including a cylindrical fuselage, wings, a tail assembly or empennage, landing gear assemblies, and a propulsion system, e.g., engines or turboprops. The fuselage is generally constructed of an interconnected lattice of longerons, stringers, ribs, and possibly other load-bearing structure, all of which is wrapped in an outer fuselage skin. The fuselage of a large passenger jet aircraft, for instance, may consist of several interconnected fuselage sections, e.g., a forward/nose section, a center section, and an aft section. The center fuselage section may include a wing box for supporting the wings. The empennage mounted to the aft fuselage section includes the aircraft's horizontal and vertical stabilizers, along with flight control surfaces such as a rudder, elevators, and trim tabs.

In light of the substantial size and mass of the various major components, a moving assembly line is typically used to assemble modern aircraft. For example, an individual passenger airplane may be moved through an assembly factory past a series of build stations. At each successive build station, a work crew may perform one or more designated work tasks, such as attaching the wings to the center fuselage section or installing the landing gear assemblies. Factory equipment such as hydraulic jacks, hoists, cranes, trailers, and join tools may be pre-arranged at each of the build stations. Work crews in some aircraft assembly plants may move along with the aircraft to further expedite certain assembly or manufacturing steps.

While a linear assembly line is a time-tested approach for constructing large complex manufactured systems such as passenger aircraft, a fully equipped and staffed assembly line typically requires a substantial amount of floor space. Additionally, a production delay occurring at a given build station on the plant floor often results in an undesirable ripple effect as upstream or downstream build stations become backlogged or idled, respectively. A need therefore exists for a more efficient factory layout and associated methods for manufacturing aircraft and other large complex systems.

SUMMARY

The present disclosure pertains to an improved factory and associated manufacturing method that are intended to improve upon conventional linear assembly lines and assembly methods of the types generally described above. For illustrative consistency, the factory is described hereinafter as one that is uniquely tailored for use in the manufacturing of large passenger airplanes or other relatively large aircraft. However, those of ordinary skill in the art will appreciate that the present teachings may be used to advantage when assembling a host of manufactured complex systems, including but not limited to special-purpose land vehicles, boats, construction equipment, and industrial robots, as well as aircraft other than the exemplary fixed wing passenger aircraft depicted in the various Figures.

The factory has clock face layout that, in its layout and function, may be thought of analogously as a "clock factory". Each individual build station within the factory is located on a corresponding "spoke" or radial position of an imaginary clock face. In keeping with the above-noted clock analogy, each radial position has a respective clock position, e.g., 3:00, 6:00, 9:00, etc. Twelve such clock positions may be used in a non-limiting embodiment of the factory. When two factory floors are used in a tiered approach, "half-hour" positions may be arranged on an upper floor and "hour" positions on a lower floor for a possible total of twenty-four such clock positions.

In contrast to a moving linear assembly line, each aircraft being assembled in the present clock factory remains stationary at its assigned build station, where the aircraft is progressively assembled or constructed from its major constituent components. The disclosed factory layout ensures that each aircraft within the factory has an unimpeded route into and out of the factory. All required components and subcomponents necessary for assembling the aircraft are centrally located and conveyed to the aircraft's respective build station. The static and stable build approach described herein ultimately enables continuous-flow production, along with a substantial reduction in the required floor space relative to a conventional assembly line when building the same number of aircraft. Moreover, unlike a moving assembly line, a production delay occurring at a particular build station in the factory does not affect the production status of aircraft being concurrently assembled at the remaining build stations within the factory. Line stoppage conditions common to linear assembly lines are therefore avoided.

An exemplary embodiment of the present clock factory includes at least one factory floor, a hub-and-spoke tool track positioned on and/or within the factory floor, and a mobile transport that moves between the various build stations of the factory via the tool track. In the envisioned hub-and-spoke configuration, equally-spaced radial track sections or "spokes" are connected to a circular center hub section. Each radial track section/spoke terminates at a respective one of the build stations. The mobile transport, upon reaching a given one of the build stations, automatically or manually transforms into one or more task-specific join tools for use at that particular build station. That is, each join tool is configured to engage and/or support a particular major component of the system during a given work task. When the manufactured system is an aircraft, for instance, the major components may include the aircraft's fuselage and wings, with the mobile transport in such an embodiment possibly transforming into multiple join tools for separate use with the fuselage and wings.

The factory in certain embodiments includes bay doors supported by an outer wall. Each bay door is configured to permit ingress of major components into the factory and egress of the manufactured system from the factory. For instance, when the manufactured system is an assembled passenger aircraft, the bay doors may be sized such that, when opened, the wings and empennage of the aircraft pass cleanly through the door opening. The bay doors may be configured as independently sliding doors, which would enable more than one adjacent bay door to be opened at any given time to permit the assembled aircraft to freely exit the factory.

The factory of the present disclosure may also include an overhead crane configured to perform another predetermined work task, e.g., lifting and positioning the empennage. In such an embodiment, the factory may also include multiple radial crane rail sections connected to a concentric pair of circular crane rails. The overhead crane may include a carriage configured to engage and translate along the circular crane rails and the radial crane rail sections, such that the crane is able to move between the various build stations via the crane rails and rail sections.

The factory floor in a particular tiered configuration may include a first/lower factory floor positioned below a smaller second/upper factory floor. That is, an outer diameter or total area of the upper factory floor is less than that of the lower factory floor. A plurality of equally-spaced ramps or another suitable transitional structure may connect the factory floors such that an aircraft assembled on the second/upper factory floor is able to move downward along one of the ramps, past another aircraft that might be present on the lower factory floor, and out of the factory.

The factory according to another possible embodiment of the disclosure includes a center tower surrounded by the factory floor(s). The tower may define a plurality of internal rooms, for instance office space housing management, maintenance, and/or operational control personnel. When multiple factory floors are used, the center tower may include elevators or hoists interconnecting the factory floors.

The factory may be optionally configured to manufacture multiple different configurations of the manufactured system, e.g., two or more aircraft of different sizes and/or models, such as a single aisle or multi-aisle passenger aircraft. The mobile transport in such an embodiment may be selectively reconfigurable for use with each of the different configurations as needed. For instance, the factory may include a human-machine interface ("HMI") device operable for generating an input signal in response to an operator touch input, with the mobile transport being automatically reconfigurable to transform into different join tools in response to the input signal.

A method is also disclosed for manufacturing an aircraft. An embodiment of the method includes admitting a fuselage and wings of the aircraft as major components into the factory through one or more bay doors supported by an outer wall, and then moving a mobile transport to a build station via circular and linear sections of a hub-and-spoke tool track. The method includes transforming the mobile transport into first and second sets of join tools when the mobile transport reaches a predetermined one of the build stations, and thereafter engaging and supporting the wings using the first set of join tools. Additionally, the method includes engaging and supporting the fuselage at the build station using the second set of join tools.

Also disclosed herein is a factory for manufacturing an aircraft. The factory according to a non-limiting exemplary embodiment includes curvilinear bay doors supported by an annular outer wall. Each curvilinear bay door is configured to translate horizontally or vertically with respect to the outer wall to permit ingress of a fuselage, wings, and an empennage into the factory, and to permit egress of the assembled aircraft from the factory. The factory has tiered first and second factory floors each with equally-spaced build stations. The first factory floor is positioned below the second factory floor and is connected thereto by equally-spaced ramps. The outer diameter of the second factory floor is smaller than that of the first factory floor.

Each factory floor of this embodiment includes a hub-and-spoke tool track having radial track sections ("spokes") connected to a circular center hub section, with each of the radial track sections terminating at a respective one of the build stations. Each floor also includes a mobile transport configured to travel along the tool track to the build stations, and to transform upon reaching a given build station into join tools configured to support the fuselage and wings during performance of a respective work task. An overhead crane is configured to position and place the empennage with respect to the fuselage at each respective one of the build stations.

A plurality of radial crane rail sections is connected to a concentric pair of circular crane rails, with the overhead crane engaging and translating along the radial crane rail sections and the circular crane rails as the overhead crane travels to the workstations. Additionally, a center tower is surrounded by the first and second factory floors. The center tower defines a plurality of rooms, and includes one or more elevators connecting the first and second factory floors.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and sub-combinations of the elements and features presented above and below.

Figure 1:
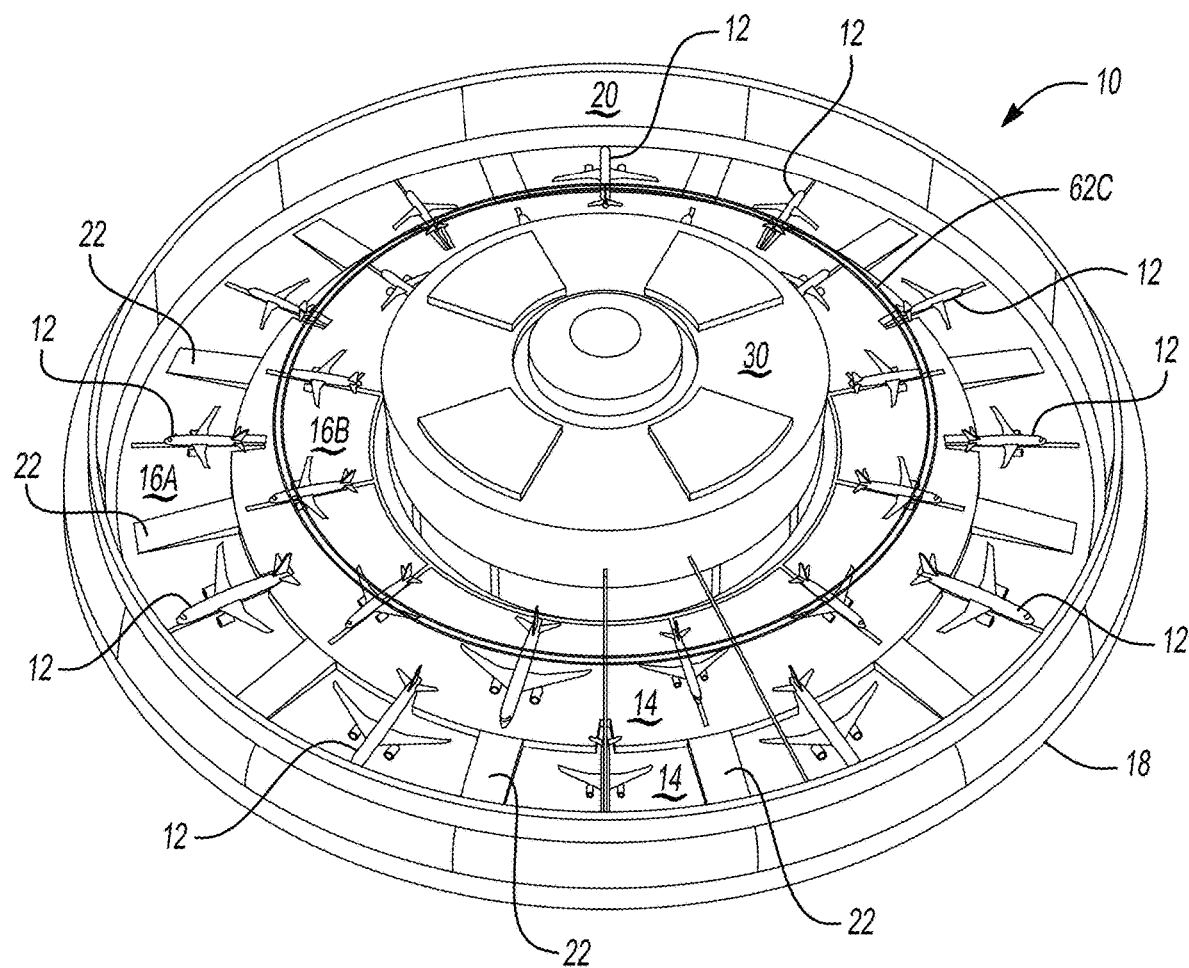
FIG. 1 is a schematic perspective view illustration of an exemplary assembly factory having a "clock factory" layout as set forth herein.

The present disclosure may be extended to modifications and alternative forms, with representative embodiments shown by way of example in the drawings and described in detail below. Inventive aspects of the disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Figure 2:
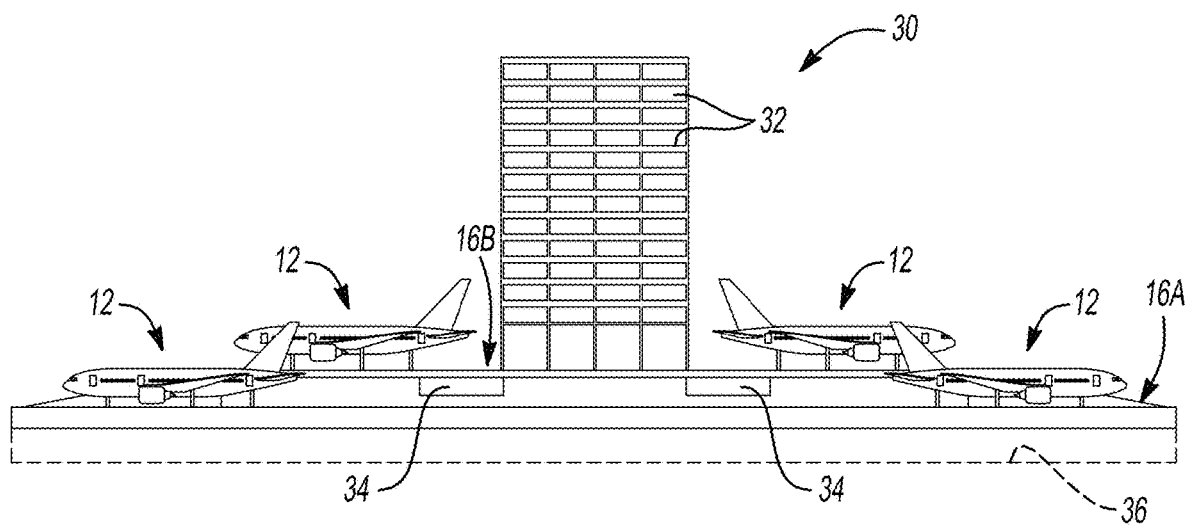
FIG. 2 is a schematic side view illustration of the clock factory shown in FIG. 1.

Referring to the drawings, wherein like reference numbers refer to like features throughout the several views, a factory 10 as depicted schematically in FIGS. 1 and 2. The factory 10 in the illustrated exemplary embodiment is configured for manufacturing aircraft 12 from a set of major components, including a fuselage, wings, empennage, landing gear, and engine assemblies. However, the disclosed factory 10 may be used to construct other manufactured systems, and therefore manufacturing and/or final assembly of the illustrated aircraft 12 is just one possible application of the present teachings. For illustrative consistency, the factory 10 of FIGS. 1 and 2 will be described hereinafter in the context of aerospace manufacturing in general and final assembly of large passenger airplanes in particular, without limiting the factory 10 to such an embodiment.

Figure 3A:
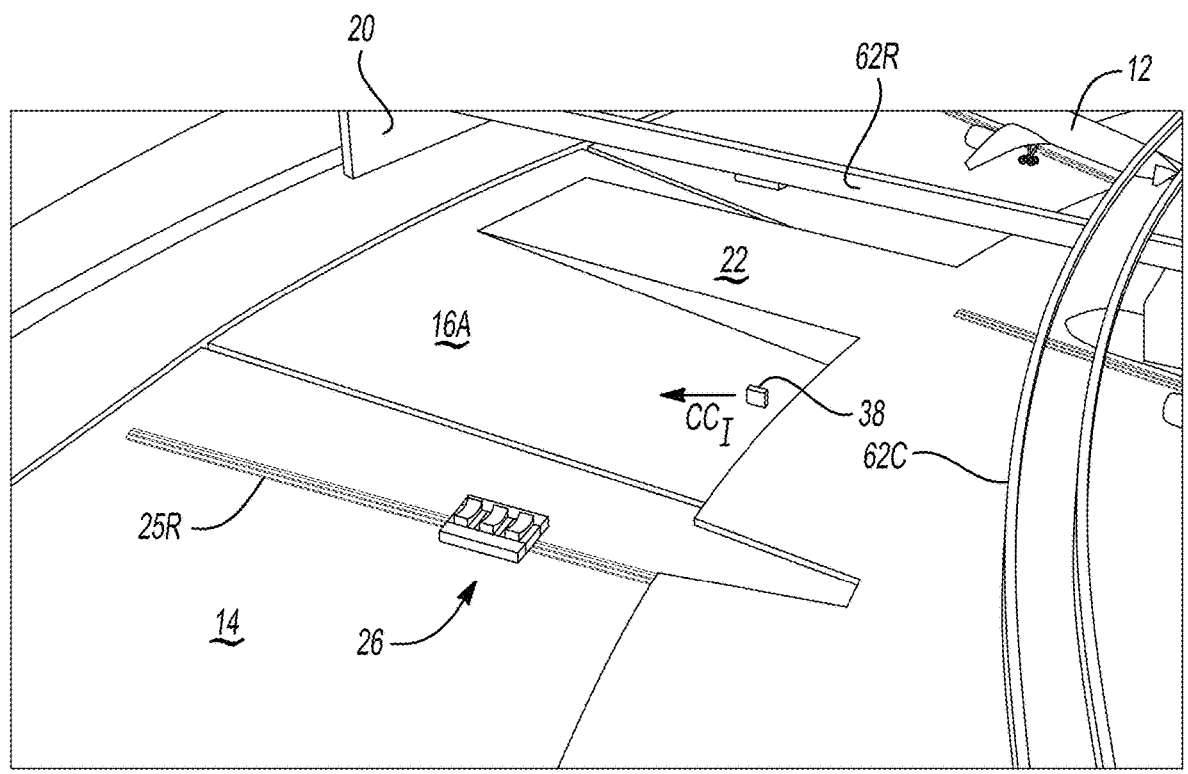
FIGS. 3A-3F are schematic perspective view illustrations of a representative build station of the clock factory shown in FIGS. 1 and 2.

The factory 10 is arranged in a clock face or hub-and-spoke configuration in which multiple equally-spaced build stations 14, one of which is shown in FIG. 3A, are arranged in a ring. In the depicted non-limiting embodiment, twelve of such build stations 14 are arranged around the periphery of a first/lower floor 16A, with the lower floor 16A being circular in some embodiments. In the manner of a clock face having twelve discrete time increments, each build station 14 may be assigned a nominal clock position, i.e., 12:00, 1:00, 2:00, etc. Accordingly, the factory 10 may be thought of conceptually as a "clock factory" 10.

The available floorspace of the factory 10 may be bounded and defined by an outer wall 18 supporting a plurality of bay doors 20. The outer wall 18 may be circular and the bay doors 20 may be curvilinear in a possible embodiment, with such shapes potentially optimizing use of space within the factory 10. However, other shapes of the outer wall 18 and bay doors 20 may be envisioned within the scope of the disclosure, including a polygon-shaped outer wall 18 and flat/linear bay doors 20, with no outer wall 18 and bay doors 20 used in other possible embodiments, and therefore the particular shape of the factory 10 may vary with the intended application. If used, the bay doors 20 may be variously embodied as independent, horizontally-sliding doors to enable more than one adjacent bay door 20 to be opened at any given time, or as vertically-sliding/overhead doors in other embodiments. The configuration of the bay doors 20 allows the bulk of an assembled aircraft 12 to freely exit the factory 10. Ingress of major components of the aircraft 12 into the factory 10 prior to assembly of the aircraft 12 is also facilitated by such bay doors 20, as many or as few of the bay doors 20 may be opened or closed as needed to create the required door opening space.

The factory 10 of FIG. 1 includes at least one factory floor, i.e., the first/lower factory floor 16A, with two factory floors 16A and 16B depicted in FIGS. 1 and 2 in an optional tiered configuration of the factory 10. As with other structural features of the factory 10, the factory floors 16A and 16B may be circular in some embodiments, as noted above, with the use of the tiered configuration of FIGS. 1 and 2 enabling higher capacity production. For instance, a possible embodiment may be envisioned in which the first/lower factory floor 16A is positioned directly below an identically configured second/upper factory floor 16B, with the outer diameter and/or overall floor space area of the upper factory floor 16B being smaller than/less than that of the lower factory floor 16A. A plurality of equally-spaced ramps 22 or another suitable transitional structure may be used to interconnect the levels of the respective first and second factory floors 16A and 16B as described below.

The first/lower factory floor 16A includes a hub-and-spoke tool track 25 having equally-spaced radial track sections 25R or "spokes" connected to a circular center hub section 25C. Each of the radial track sections 25R terminates at a respective build station 14. A mobile transport 26, which is described in further detail below with reference to FIGS. 3A-4, is configured to engage and/or align with the tool track 25, travel to the build stations 14 arranged along the tool track 25, and engage and support each of the major components used in the assembly of the various aircraft 12 during a predetermined work task performed at a respective one of the build stations 14. As used herein, the term "track" refers to a pathway configured to guide the mobile transport 26 to and from a given build station 14. Such a track may be embodied as a physical rail or track mounted to the floor of the factory 10, as slots disposed within such a floor, and/or as another physical guide structure. Alternatively, the tool track 25 may be embodied as a virtual track in the form of a designated pathway along which the mobile transport 26 travels, e.g., as an automatically guided vehicle or AGV. Such guidance may be facilitated using a local positioning system, inertial, global, and/or another suitable guidance system restricting motion of the mobile transport 26 to the path defined by the tool track 25.

The factory 10 may also include a center tower 30 as shown in FIG. 2. The center tower 30 may have a circular, polygonal, or other external shape and surrounded by the factory floor 16A, as well as the optional factory floor 16B when a tiered configuration is employed. The center tower 30 defines a plurality of rooms 32. In the tiered configuration of FIGS. 1 and 2, elevators 34 may interconnect the first and second factory floors 16A and 16B. The elevators 34 may be embodied as freight elevators, platforms, or hoists/lifts to facilitate movement of parts and/or work crew between the factory floors 16A and 16B as needed.

Additionally, at least one basement level 36 may be present below the first/lower floor 16A. In such a configuration, the elevators 34 could also be configured to travel from the basement level(s) 36 to the first and second factory floors 16A and 16B, or another elevator (not shown) may be used for such a purpose. The basement level 36 may be used in some embodiments of the factory 10 to store repair parts, maintenance equipment, heating, ventilation, and air conditioning systems, electrical, water, and/or sewage systems for the center tower 30 and/or plant 10, as well as facilities for work crews performing the various work tasks at the workstations 14. The rooms 32 may include office space, e.g., for production supervisors, logistics, planning, and maintenance personnel, break rooms, training rooms, component storage rooms, and/or other required workspaces. The center tower 30 may be circular as shown in the non-limiting embodiment of FIG. 1 to provide such personnel a full unimpeded 360° view of the factory 10 and each of the aircraft 12 being assembled therein, without limiting the center tower 30 to such a shape.

A principle of operation of the factory 10 is that of continuous simultaneous production of multiple aircraft 12 at the various build stations 14. At each build station 14, an aircraft 12 remains stationary as major components thereof are conveyed to the aircraft 12. Additionally, each build station 14 has unimpeded access to the bay doors 20 for easy egress of the assembled aircraft 12 from the factory 10.

Moreover, in the event that a given stage of assembly of a particular aircraft 12 experiences a delay at a particular build station 14, the disclosed layout and construction of the factory 10 helps ensure that progress of the other aircraft 12 is not impeded. For instance, the configuration of the respective first/lower and second/upper factory floors 16A and 16B and ramps 22 ensures that each individual aircraft 12 can be removed from the factory 10 without having to reposition any of the remaining aircraft 12.

Figure 1A:
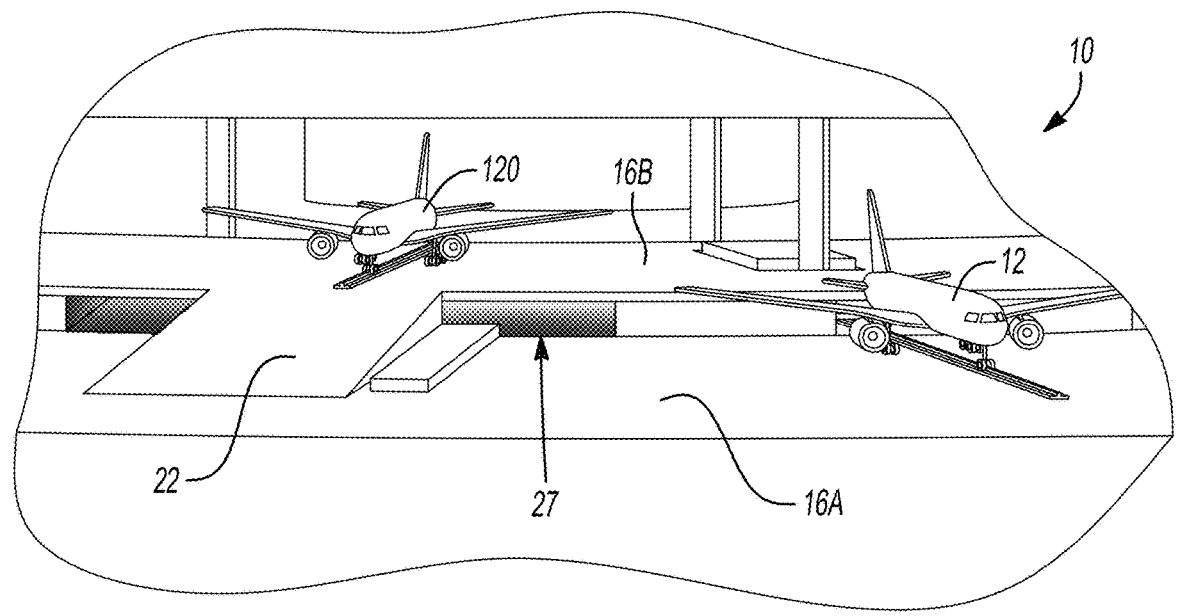
FIG. 1A is another schematic perspective view illustration of the factory shown in FIG. 1.

Referring briefly to FIG. 1A, this Figure depicts a portion of the factory 10 of FIG. 1 from the level of the first/lower factory floor 16A. In this example, aircraft 12 and 120 of different configurations are undergoing the same stage of assembly on the respective first and second floors 16A and 16B. Using the clock face analogy, the aircraft 12 on for 16A occupies an "hour" position and the aircraft 120 on floor 16B occupies a "half hour" position. Ideally, adjacent hour/half hour positions in the factory 10 are scheduled to perform the same work task, which enables efficient sharing of resources and work crews. Openings 27 located to the rear of the aircraft 12 and a corresponding ramp 22 may lead to one or more rooms located below the factory floor 16B, with such rooms possibly being used to store tools, subcomponents and parts used in a given work task. The elevators 34 of FIG. 1 may travel between the first and second floors 16A and 16B to move people or parts between the half hour and hour positions as needed. The opening 27 behind the aircraft 12 may likewise be used by the mobile transport 26 described below to access a similar lift and travel between the first and second floors 16A and 16B when needed.

A representative progressive build cycle for assembling an exemplary aircraft 12 in the factory 10 of FIGS. 1, 1A, and 2 is depicted in FIGS. 3A-3F for an exemplary build station 14 located on the first/lower factory floor 16A. Safety railing around the perimeter of the second/upper factory floor 16B is omitted for illustrative clarity and simplicity. The radial track section 25R of the above-noted hub-and-spoke tool track 25 extends into the build station 14 as shown and terminates at the build station.

The mobile transport 26 may exit a storage area of the center tower 30 (see FIG. 1) and translate along the radial track section 25R to the build station 14 before stopping at a predetermined "ready" position (FIG. 3A). Such a build station 14 may be bounded on each side by a ramp 22, with one such ramp 22 visible in FIG. 3A along with a portion of a bay door 20. For example, the mobile transport 26 may be an electrified platform powered by a battery pack and an electric traction motor (not shown) in some embodiments. As each workstation 14 is configured to construct a particular model of the aircraft 12, and the constituent build tools of the mobile transport 26, when deployed, are individually configured to support a given major component of the aircraft 12 during a given work task, the position of the mobile transport 26 within the build station 14 may be predetermined and build-specific.

Figure 3B:
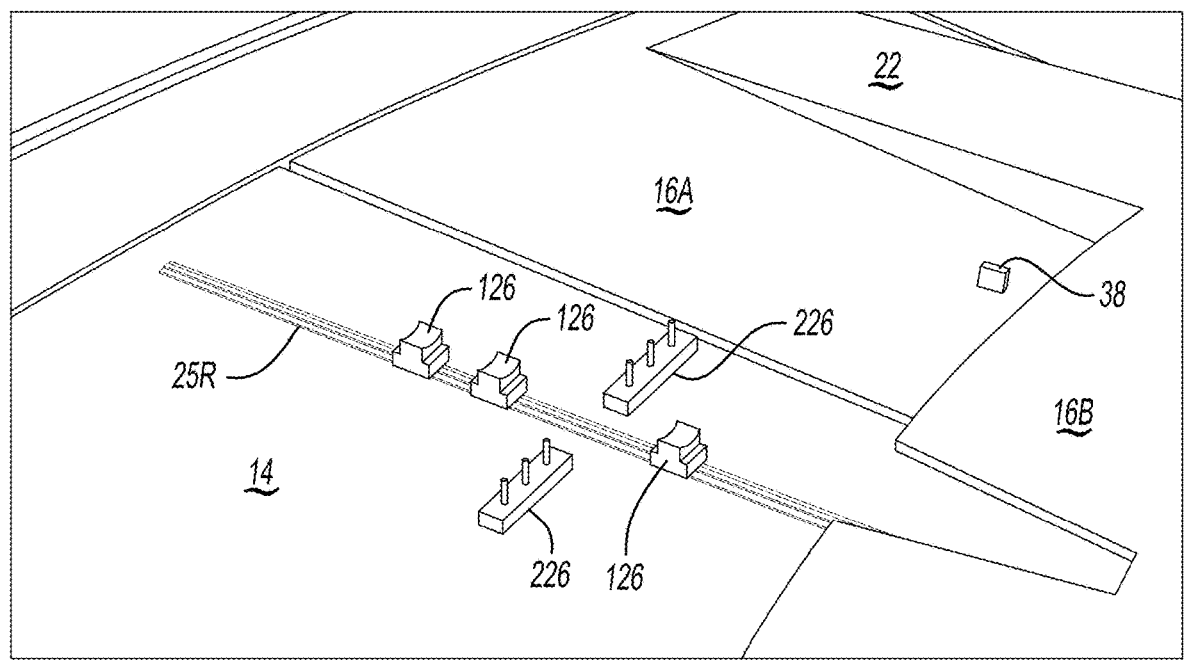

As best shown in FIG. 3B, upon arrival at the build station 14 the mobile transport 26 transforms into one or more join tools, with representative first and second sets join tools 126 and 226 depicted for the illustrated work tasks. Spacing of the join tools 126 and 226 is accordance with a calibrated configuration for the particular aircraft 12 being assembled. For example, the mobile transport 26 may transform into the join tools 126 and 226, either manually or automatically, with each of the join tools 126 and 226 having a corresponding function and configuration. As will be appreciated by those of ordinary skill in the art, typical aircraft join tools are used to cradle and securely support a particular major component during a particular stage of an aircraft assembly process. For example, the join tools 126 may be configured to engage and support a fuselage 44 (FIG. 3E), while the join tools 226 may be configured to engage and support a particular wing 40A or 40B (FIG. 3D) of the aircraft 12. For a given configuration of the aircraft 12, for instance, a given join tool 126 or 226 may lift or lower to the same position every time the join tool 126 or 226 is deployed. The simplified schematic depiction of the join tools 126 and 226 is intended to show relative size and positioning, as opposed to a true structural depiction of any particular embodiment of the join tools 126 and 226.

Optionally, the factory 10 may include a human-machine interface ("HMI") device 38 operable for generating an input signal (arrow $CC_1$) as shown in FIG. 3A, e.g., in response to a touch input to the HMI device 38, with the mobile transport 26 being automatically reconfigured into its constituent join tools 126 and 226 or other join tools in response to the input signal. For instance, when the factory 10 is configured to construct multiple different models of aircraft 12 having different wingspans, heights, and lengths, the input signal (arrow $CC_1$) may result in a calibrated spacing of the various join tools 126 and 226 to accommodate the footprint of the particular aircraft 12 being assembled. While shown a distance apart from the mobile transport 26, the HMI device 38 may be attached to the mobile transport 26 in other embodiments or placed elsewhere in the build station 14.

Figure 3C:
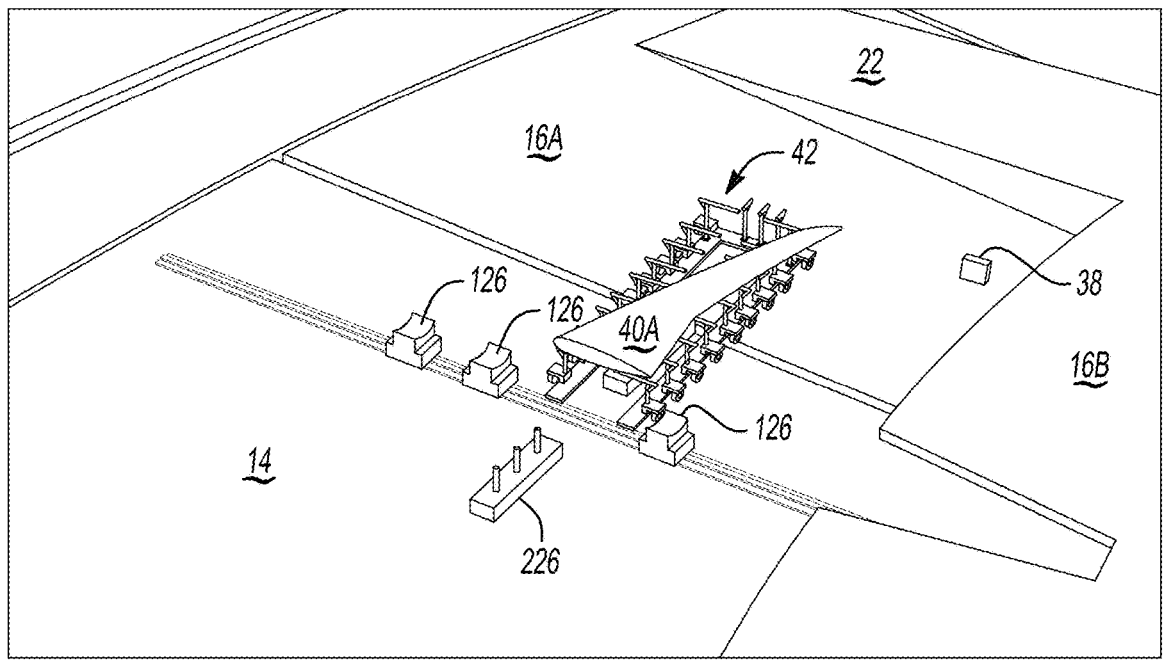
Figure 3D:
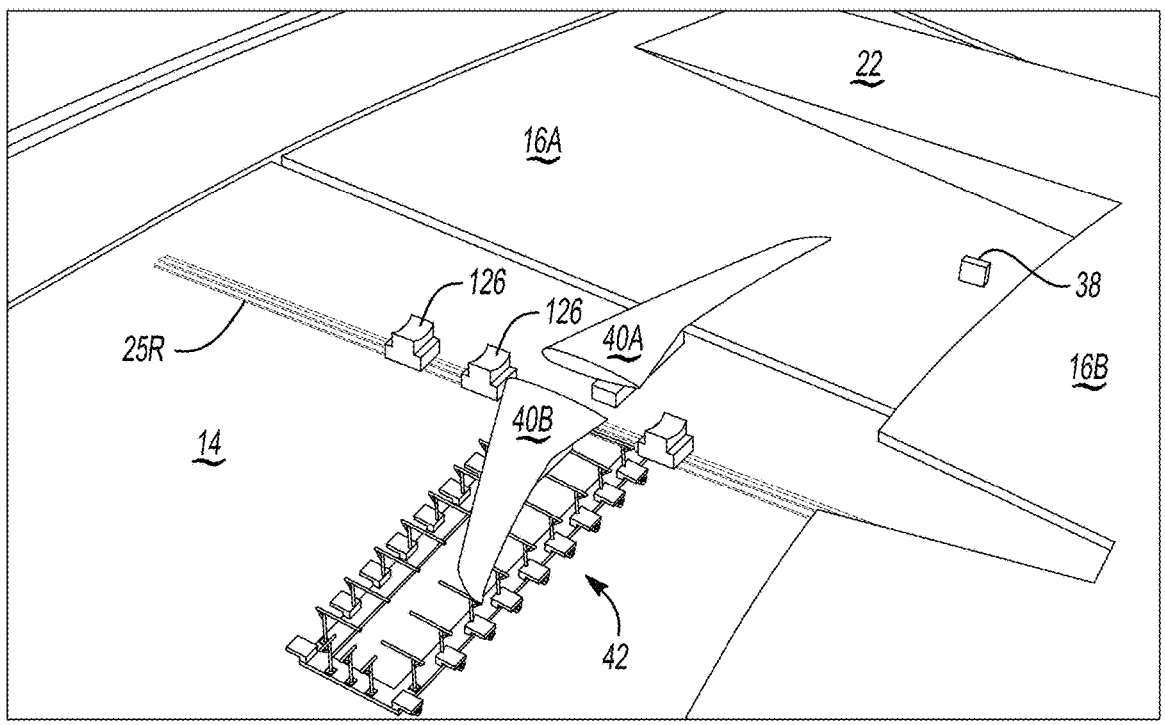
Figure 4:
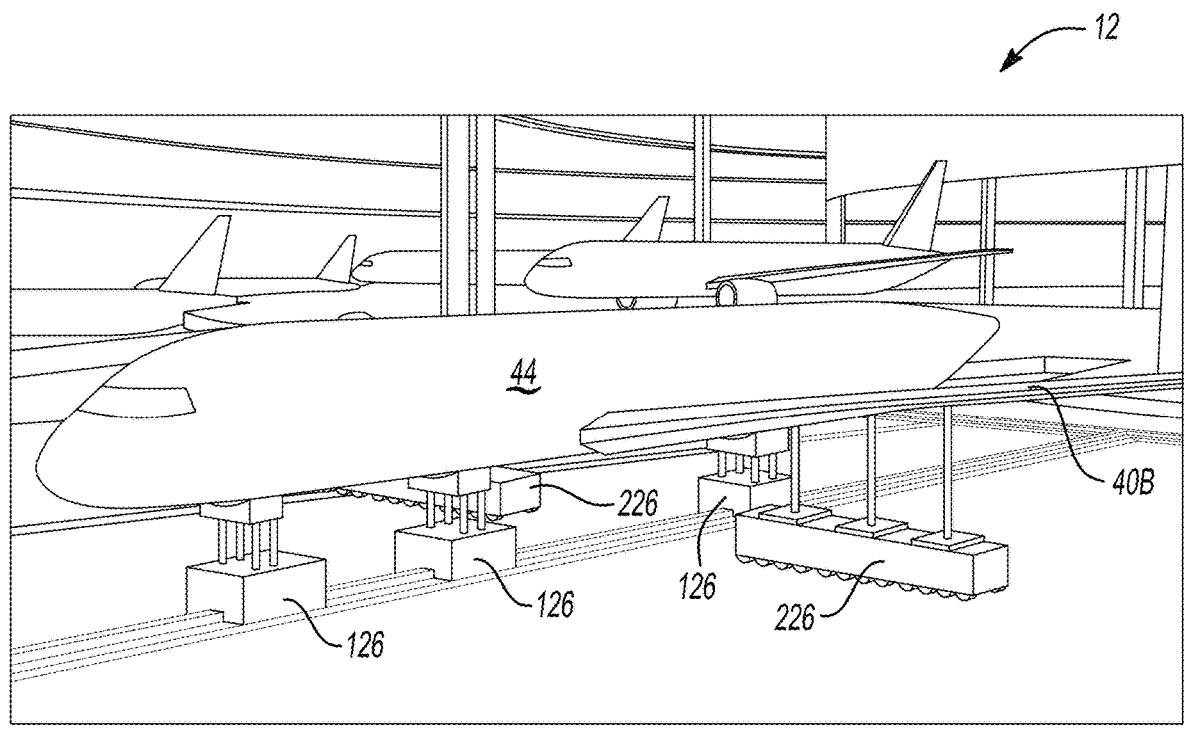
FIG. 4 is a schematic perspective view illustration of a partially-assembled aircraft and being assembled using a mobile transport within the exemplary clock factory of FIGS. 1 and 2.

Referring to FIGS. 3C and 3D, major components in the form of the above-noted wings 40A and 40B may be conveyed to the build station 14 through the bay doors 20 of FIGS. 1 and 3A. Once a first wing 40A is supported by a join tool 226, for instance, final assembly or positioning of the first wing 40A in the build station 14 may thereafter continue. Such assembly may optionally include final connection and testing of flight control surfaces and actuators, surface panels, etc. Additional fixtures 42 such as trailers, hydraulic jacks, and/or scaffolding may be positioned beneath the first wing 40A as shown, e.g., by deploying from below the floor or by being rolled into place. Required electrical power, compressed air, hydraulics, and other necessary resources may be routed under the floors and provided to the various build stations 14 from below. A work task involving the second wing 40B in FIG. 3D is supported and performed in the same manner.

Figure 3E:
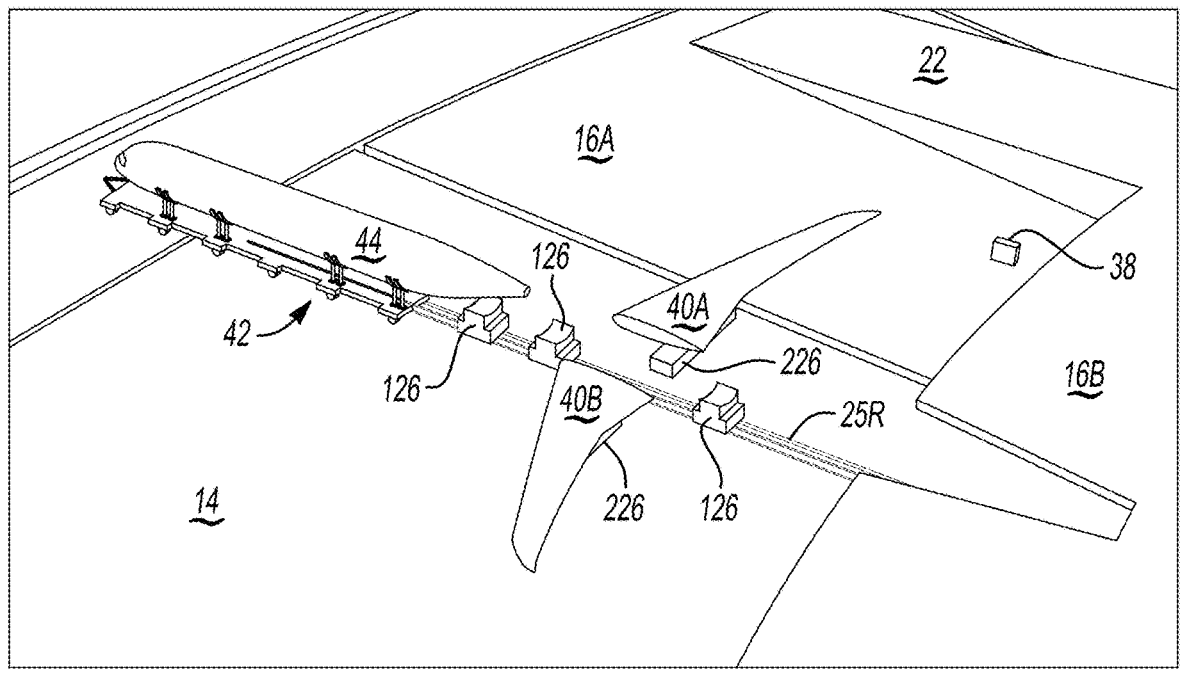
Figure 3F:
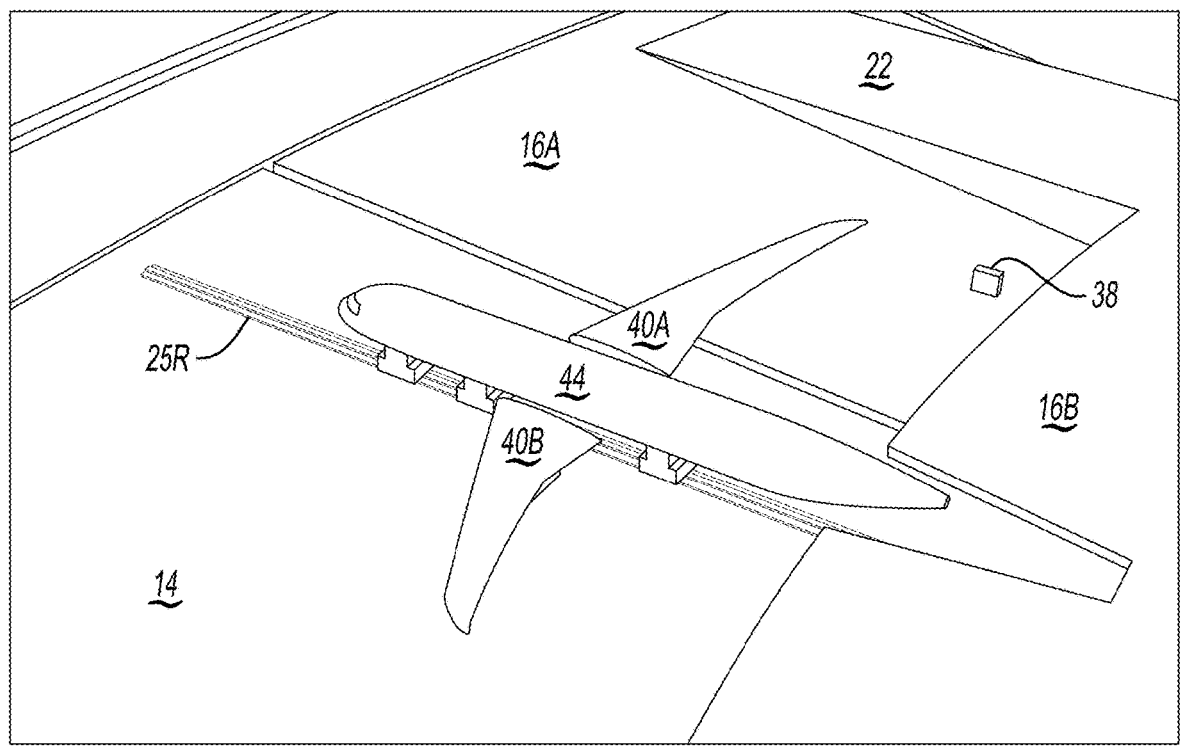

The factory 10 may thereafter admit a fuselage 44 into the build station 14 as depicted in FIG. 3E. As with the wings 40A and 40B, the fuselage 44 may arrive pre-assembled or semi-assembled via additional fixtures 42 through the bay doors 20 of FIGS. 1 and 3. The longitudinal axis of the fuselage 44 is aligned with the remaining join tools 126 as shown, with the fixtures 42 wheeled away to leave the weight of the fuselage 44 supported by the join tools 126 as best shown in FIG. 3F. Work crews in the build station 14 may thereafter perform the necessary work tasks to securely join the wings 40A and 40B to the properly positioned fuselage 44.

Figure 5:
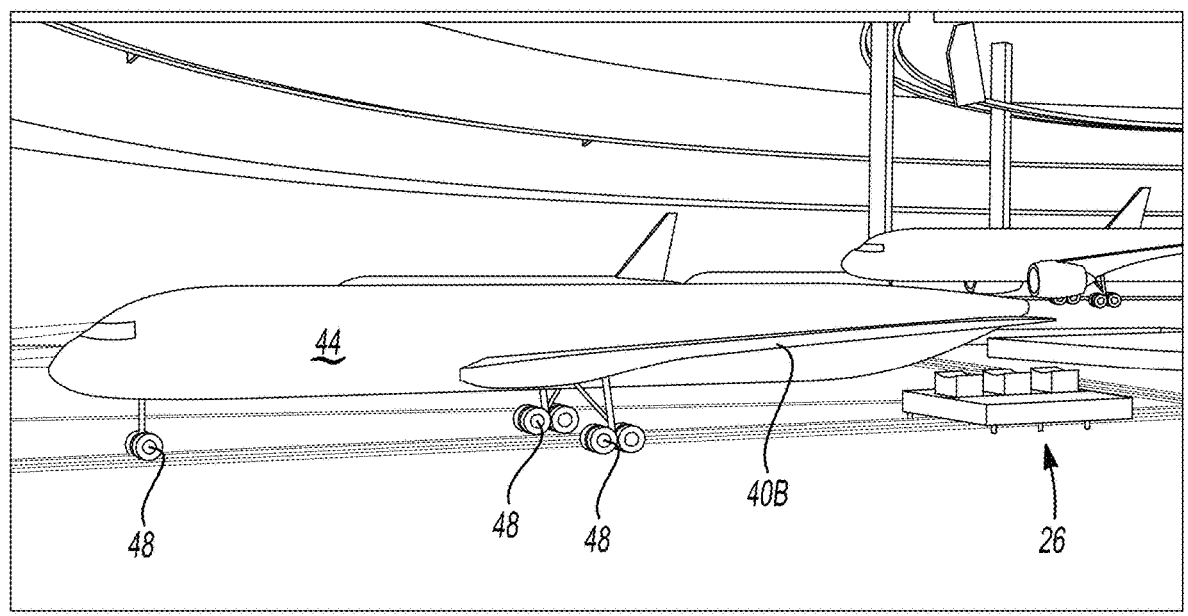
FIG. 5 is a schematic perspective view illustration of the partially-assembled aircraft of FIG. 4 after installation of a landing gear assembly and removal of the mobile transport.

FIG. 4 depicts the aircraft 12 as it appears upon joining of the wings 40A and 40B to the fuselage 44. As shown, the fuselage 44 and wings 40A and 40B remain supported from below by the corresponding join tools 126 and 226 as the aircraft 12 awaits installation of its landing gear assemblies. Other aircraft 12 are depicted in the factory 10 at the same or other stages of production. The landing gear assemblies 48 may be installed, and the join tools 126 and 226 subsequently reassembled to form or stow on the mobile transport 26. The mobile transport 26 is then withdrawn from the build station 14 for possible redeployment to another build station 14. The aircraft 12 in FIG. 5 thereafter supports its own weight via the installed landing gear assemblies 48.

Figure 6:
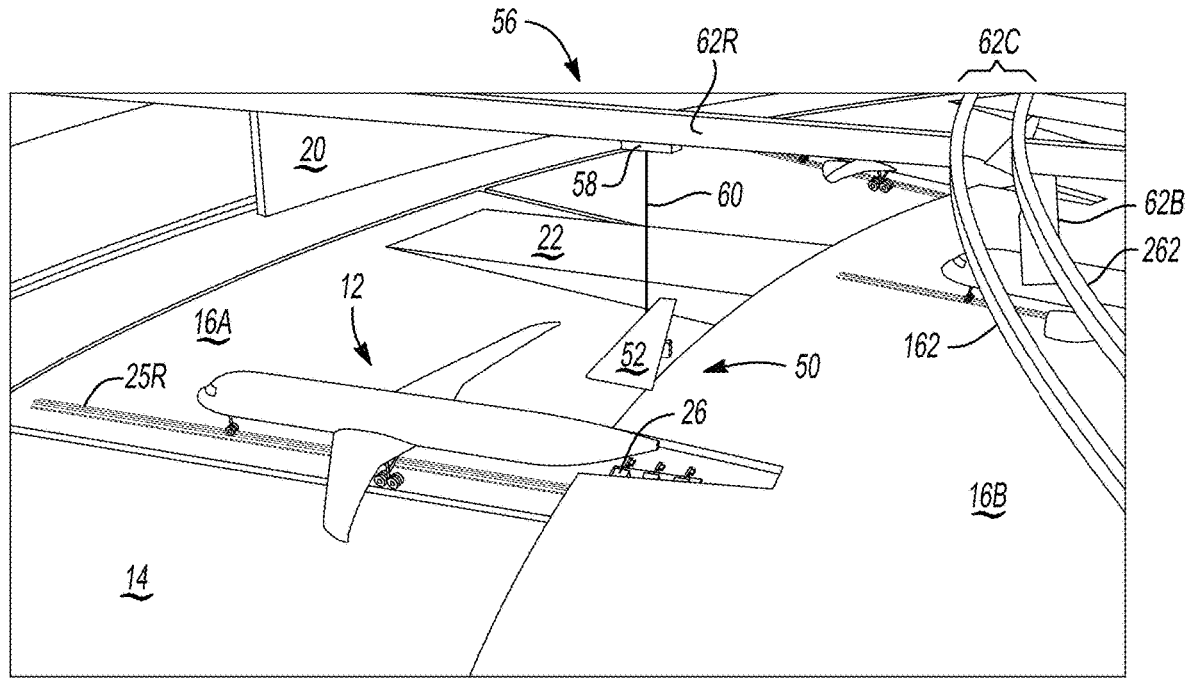
FIGS. 6 and 7 are schematic perspective view illustrations of the partially-assembled aircraft of FIG. 5 during installation of an empennage.
Figure 7:
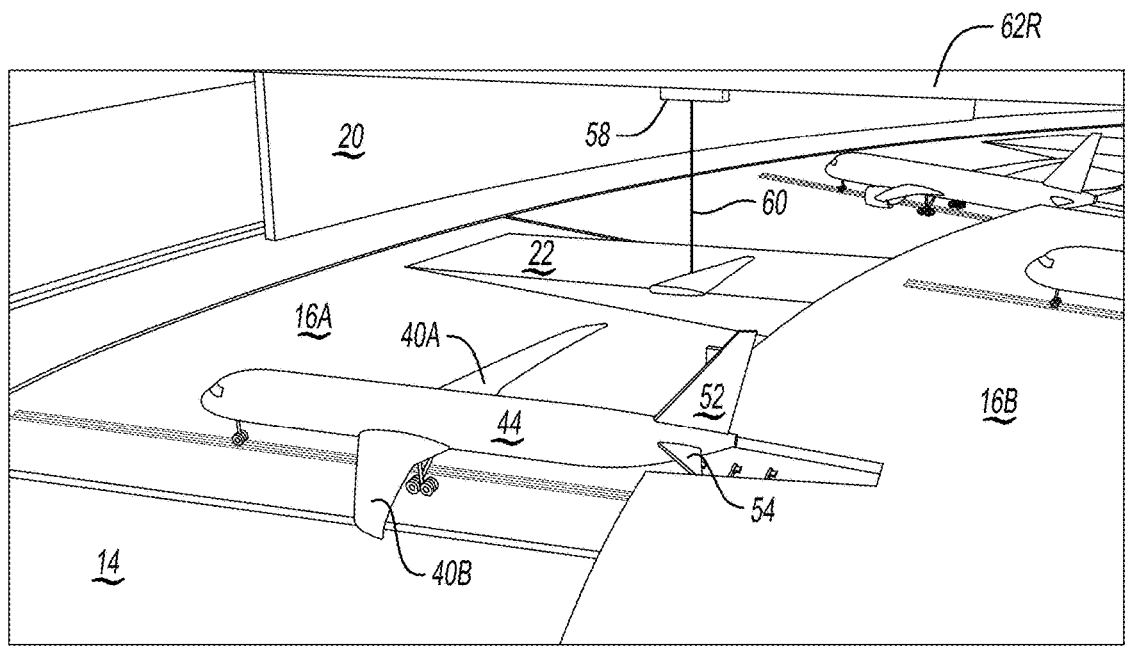

Referring to FIGS. 6 and 7, assembly of the aircraft 12 at the representative build station 14 continues with installation of the tail assembly or empennage 50, i.e., a vertical fin 52 (FIG. 6) and horizontal stabilizers 54 (FIG. 7). To this end, the factory 10 may be equipped with an overhead crane 56 that is configured to perform another predetermined work task, in this instance lifting and positioning the vertical fin 52 and horizontal stabilizers 54. The crane 56 may include a carriage 58 and cable 60, with the cable 60 terminating in an end-effector (not shown). Such an end-effector securely grasps the major component so that the major component can be moved into position for joining the empennage 50 to the fuselage 44.

In a possible embodiment, the factory 10 may include a plurality of radial crane rail sections 62R connected to a concentric pair of circular crane rails 62C, i.e., first and second circular crane rails 162 and 262. Portions of the rail sections 62R and crane section 62C are also visible in FIG. 3A. The overhead crane 56 may be configured to engage and translate along the circular crane rails 62C and the radial crane rail sections 62R. To facilitate use of the overhead crane 56 at the various workstations 14 of the first/lower factory floor 16A and the second/upper factory floor 16B, the crane 56 may include a bridge section 62B that selectively opens and closes a gap in the radial crane rail sections 62R to enable the carriage 58 to transfer between the first and second circular crane rails 162 and 262. Other configurations may be envisioned that would enable use of the overhead crane 56, possibly including separate overhead cranes on the respective first and second circular crane rails 162 and 262.

Figure 8:
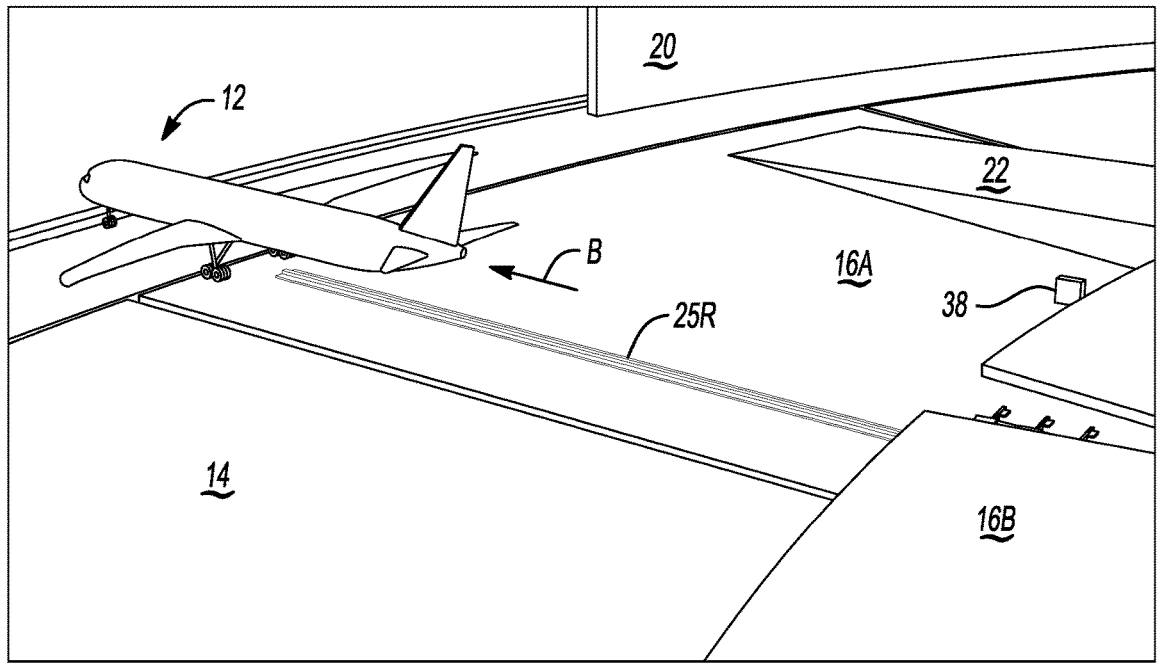
FIG. 8 is a schematic perspective view illustration of an assembled aircraft exiting the clock factory of FIGS. 1 and 2.

FIG. 8 depicts the completed aircraft 12 in the process of being removed from the factory 10. For instance, the aircraft 12 may be towed in the direction of arrow B through an open curvilinear door 20 via a towline and tractor (not shown). The now-vacated build station 14 is ready for commencement of another build cycle as exemplified in FIGS. 3A-7. When the factory 10 includes the second/upper factory floor 16B, the aircraft 12 or 120 on the factory floor 16B may be towed down the ramp 22, with the ramp 22 being appropriately sized and angled, and with each ramp 22 being positioned midway between adjacent workstations 14 of the first/lower factory floor 16A. Such a configuration ensures that the wings 40A and 40B of an aircraft 12 descending a ramp 22 from the second/upper factory floor 16B easily clear any aircraft 12 that might be situated on the first/lower factory floor 16A. In some embodiments, the angle of the ramps 22 may be adjustable to provide a desired ramp pitch, and/or the factory floor 16A may be set at a semi-subterranean level and thus towed via tractor or other mechanism up a slight incline. Although omitted for illustrative simplicity, motion of the aircraft 12 or 120 may be arrested using other mechanisms to ensure proper motion control of the aircraft 12 or 120 at all times within the factory 10.

Figure 9:
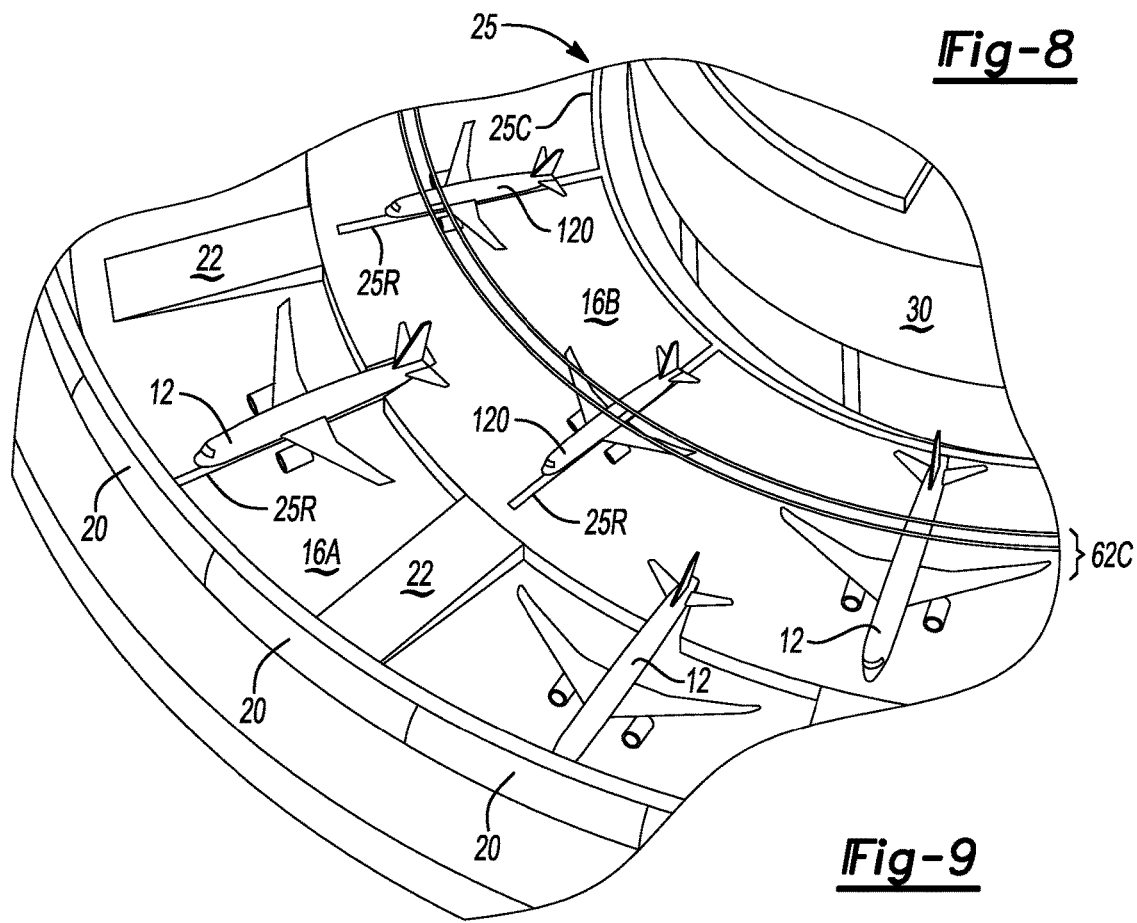
FIG. 9 is a schematic perspective view illustration of a portion of a representative two-tier configuration of the clock factory shown in FIGS. 1 and 2.

FIG. 9 illustrates a section of the plant 10 in which differently configured aircraft 12 and 120 are being concurrently assembled. For simplicity, the aircraft 12 and 120 are shown fully assembled. Each aircraft 12 and 120 on the second/upper factory floor 16B is aligned with a respective ramp 22 and bay door(s) 20. As noted above, once a given aircraft 12 or 120 on the second/upper factory floor 16B is ready to exit the factory 10, the aircraft 12 or 120 simply rolls down the ramp 22, e.g., via controlled towing or winching. The height and angle of the ramps 22 ensures that the exiting aircraft 12 or 120 clear the aircraft 12 or 120 located directly below on the first/lower factory floor 16A.

As will be appreciated by those of ordinary skill in the art, a manufacturing method may be readily envisioned in view of the above-described factory 10. A particular embodiment of the method includes admitting major components of the aircraft 12 into the factory 10, possibly through the bay doors 20 supported by the outer wall 18 of FIG. 1. The method may include translating the mobile transport 26 of FIG. 3A with respect to or along the tool track 25 to a given one of the build stations 14, e.g., using traction motors or other suitable propulsion systems, with the mobile transport 26 itself being constructed of one or more join tools 126 and/or 226, as best shown in FIG. 3B. The method then includes transforming the mobile transport 26 into the first and second sets of join tools 126 and 226, either manually or automatically.

The method in this embodiment may include engaging and supporting the wings 40A and 40B at the build station 14 during performance of a first work task using the first set of join tools 126, and then engaging and supporting the fuselage 44 at the build station 14 using the second set of join tools 226 during performance of a second work task. Additionally, the method may include installing landing gear assemblies 48 (see FIG. 5) to the fuselage 44 as a third work task after completion of the second work task, disconnecting the first and second sets of join tools 126 and 226 from the aircraft 12, and then reassembling the mobile transport 26 from its constituent first and second sets of join tools 126 and 226. Thereafter, the method may include removing the mobile transport 26 from the build station 14, e.g., with the mobile transport 26 propelling itself away from the build station 14.

The overhead crane 56 of FIG. 7 may be used as part of the method to perform another predetermined work task in the build stations 14. Thus, the method may include using the overhead crane 56 to position and place the empennage 50 of FIG. 6 with respect to the fuselage 44 as a fourth work task after completion of the third work task, including translating the carriage 58 of the overhead crane 56 along a radial crane rail sections 62R and the circular crane rail sections 62C of the overhead crane 56. After completing the fourth work task, the assembled aircraft 12 is moved down the closest ramp 22 interconnecting the first factory floor 16A and the second factory floor 16B.

At any given stage of assembly, the method may include moving parts and/or personnel between the first and second factory floors 16A and 16B via an elevator 34 of the circular center tower 30 (see FIG. 2). As noted above and shown in FIG. 3A, the method may include generating the input signal (arrow $CC_1$) via the HMI device 38, and automatically configuring the mobile transport 26 for use with a first or second configuration of the aircraft 12 in response to the input signal.

In terms of optional production scheduling and throughput, the factory 10 described above may be used to accommodate a particular production schedule. The actual schedule would depend on the particular build volume and manufactured system being assembled. In a non-limiting exemplary approach when assembling aircraft 12, for instance, with twelve clock face positions on each of two tiers of the factory 10 shown in FIGS. 1 and 2, an aircraft 12 may be constructed in six days using two shifts. Every twelve hours, two of the aircraft 12 may roll out of the factory 10, with a new build cycle commencing at the recently vacated build station 14. Every hour position of the hypothetical clock face projected onto the first/lower factory floor 16A and every half-hour position projected onto the second/upper factory floor 16B may be paired to the same build status to facilitate cooperative build efforts between work crews. Standardized work crews may be deployed for certain tasks, possibly rotating to different aircraft 12 and different build stations 14 upon completion of a given work task, with commodity teams possibly being deployed in place at a particular build station 14 for other work tasks.

For example, and solely for the purpose of illustrating one possible use of the factory 10, the fuselage 44 and wings 40A and 40B of FIG. 3E may be delivered and joined on day one/shift one by a standardized work crew, with the empennage 50 hung on day one/shift two using the overhead crane 56. Final systems installation may occur on day one/shift two and on day two/shift one, with systems installation occurring using another standardized work crew. Two shifts of power/oil-on test may be conducted on day two/shift two and day three/shift one, with rig and test occurring on day three/shift two and day four/shift one. Both processes may likewise be performed by another standardized work team. Day four/shift two and day five/shift one may be used to hang and test the engines. The last two shifts, i.e., day five/shift two and day six/shift one, may be dedicated to cover and seal operations, with the aircraft 12 rolled out at the completion of day six/shift one.

As these processes occur, with corresponding standardized work crews rotating to other clock face positions and aircraft 12 upon completion of a work task, the commodity teams may remain at a given aircraft 12 and build station 14. Exemplary static work crews may be dedicated to installing the interior of the aircraft 12 from days one through five, including seats, overhead bins, and other interior components, with exterior paneling installed on days three through five.

As will be appreciated by those of ordinary skill in the art in view of the foregoing disclosure, the factory 10 described above with reference to FIGS. 1-9 provides a number of important benefits and improvements over the existing state of the art. One important benefit of the factory 10 is the prevention of "line stop" conditions due to a particular aircraft 12 experiencing a delay or disruption as with an aircraft 12 moving along a conventional linear assembly line. That is, as each aircraft 12 has its own direct route out of the factory 10, the status of a particular aircraft 12 is not dependent on the production status of any other aircraft 12 in the factory 10.

Additionally, the required footprint/required surface area of the factory 10 relative to conventional final assembly approaches for assembling the same number of aircraft 12 may be reduced by 20-40% or more. As each aircraft 12 remains stationary at its respective build station 14, the present factory 10 avoids much of the associated infrastructure needed for moving the aircraft 12, along with setup and tear down of the associated tooling, jacks, hoists, and other requisite structure. More efficient logistical flows are enabled, e.g., with closer proximity and multi-level arrangement reducing travel distances for parts, tools, equipment, and personnel. Likewise, the configuration of the factory 10 and crane 56 tracks simplifies operational support, with line-of-sight visibility to all aircraft 12 in the factory 10 provided by the center tower 30 of FIGS. 1, 2, and 9.

Aspects of the present disclosure have been described in detail with reference to the illustrated embodiments. Those skilled in the art will recognize, however, that many modifications may be made thereto without departing from the scope of the present disclosure. The present disclosure is not limited to the precise construction and compositions disclosed herein. Any and all modifications, changes, and variations apparent from the foregoing descriptions are within the scope of the disclosure as defined by the appended claims. Moreover, the present concepts expressly include any and all combinations and sub-combinations of the preceding elements and features.

What is claimed is:

1. A factory for assembling a system from a plurality of components, the factory comprising:
   at least one factory floor having a plurality of equally-spaced build stations positioned thereon;
   a hub-and-spoke tool track positioned on or within the factory floor and having equally-spaced radial track sections connected to and extending radially from a circular center hub section, wherein each of the radial track sections terminates at a respective one of the build stations;
   a mobile transport configured to travel along the circular center hub section and the radial track sections of the hub-and-spoke tool track and, upon reaching a predetermined one of the build stations, to transform into one or more build tools each configured to engage and support a respective one of the components during performance of a predetermined work task; and
   wherein the factory floor includes a first factory floor positioned below a second factory floor, and further includes a plurality of equally-spaced ramps interconnecting the first and second factory floors.

2. The factory of claim 1, further comprising: an overhead crane configured to move between the build stations and perform another predetermined work task at each of the build stations.

3. The factory of claim 2, wherein the overhead crane includes a plurality of radial crane rail sections connected to a concentric pair of circular crane rails, and a carriage configured to engage and translate along the radial crane rail sections and the circular crane rails.

4. The factory of claim 1, further comprising: a center tower surrounded by the first and second factory floors and defining a plurality of rooms.

5. The factory of claim 1, further comprising: an elevator configured to move between the first and second factory floors.

6. The factory of claim 1, wherein the factory is configured for assembly of multiple different configurations of the system, and wherein the mobile transport is selectively reconfigurable for use with each of the multiple different configurations of the system.

7. The factory of claim 6, further comprising: a human-machine interface device operable for generating an input signal, wherein the mobile transport is automatically reconfigured for use with one of the multiple different configurations in response to the input signal.

8. The factory of claim 1, wherein the system is an aircraft, the components include a fuselage and wings, and the build tools includes a first set of join tools configured to engage and support the fuselage and a second set of join tools configured to engage and support the wings.

9. The factory of claim 1, further comprising:
   an outer wall surrounding the factory floor; and
   a plurality of bay doors supported by the outer wall, wherein each of the bay doors is configured to permit ingress of the components into the factory prior to assembling the system, and egress of the system from the factory after assembling the system.

10. A method for manufacturing an aircraft, comprising:
admitting a fuselage and wings of the aircraft as components onto a factory floor of a factory having a plurality of equally-spaced build stations, and wherein the factory is configured for assembly of multiple different configurations of the aircraft;
moving a mobile transport along a circular center hub section of a hub-and-spoke tool track and radial track sections of the hub-and-spoke tool track to a predetermined one of the build stations, wherein the radial track sections extend radially from the circular center hub section, and wherein each of the build stations are disposed at an end of a respective spoke of the hub-and-spoke tool track, and wherein the mobile transport is selectively reconfigurable for use with each of the multiple different configurations;
transforming the mobile transport into building tools including first and second sets of join tools when the mobile transport reaches the predetermined one of the build stations;
engaging and supporting the wings during performance of a first work task using the first set of join tools of the mobile transport;
engaging and supporting the fuselage using the second set of join tools of the mobile transport during performance of a second work task;
generating an input signal via a human-machine interface device; and
automatically reconfiguring the mobile transport for use with one of the multiple different configurations of the aircraft in response to the input signal.

11. The method of claim 10, further comprising:
installing landing gear assemblies to the fuselage as a third work task;
disconnecting the first and second sets of join tools from the aircraft;
reassembling the mobile transport from the first and second sets of join tools; and
moving the mobile transport away from the predetermined one of the build stations.

12. The method of claim 11, further comprising: using an overhead crane to position and place an empennage with respect to the fuselage as a fourth work task, including translating a carriage of the overhead crane along a radial crane rail section and a circular crane rail section of the overhead crane.

13. The method of claim 12, wherein the factory floor includes a first factory floor positioned below a second factory floor that is smaller in diameter than the first factory floor, the method further comprising: after completing the fourth work task, moving the aircraft down a ramp interconnecting the first factory floor and the second factory floor.

14. The method of claim 13, further comprising a center tower surrounded by the first and second factory floors, the method further comprising: moving parts and/or personnel between the first and second factory floors via an elevator.

15. A factory for manufacturing an aircraft, comprising:
an annular outer wall;
a plurality of sliding curvilinear bay doors supported by the annular outer wall, wherein each of the sliding curvilinear bay doors is configured to permit ingress of a fuselage, wings, and empennage of the aircraft into the factory prior to assembling the aircraft, and egress of the aircraft from the factory after assembling the aircraft; and
first and second factory floors each having equally-spaced build stations, the first factory floor being positioned below the second factory floor and connected thereto by equally-spaced ramps, wherein each of the first and second factory floors comprises:
a hub-and-spoke tool track having equally-spaced radial track sections connected to and extending radially from a circular center hub section, wherein each of the radial track sections terminates at a respective one of the build stations;
a mobile transport configured to travel along the hub-and-spoke tool track to the build stations, transform into building tools including first and second sets of join tools upon reaching a predetermined one of the build stations, and thereafter support the fuselage and the wings during performance of a respective work task using the respective first and second sets of join tools;
an overhead crane configured to position and place the empennage with respect to the fuselage;
a plurality of radial crane rail sections connected to a concentric pair of circular crane rails, wherein the overhead crane is configured to engage and translate along the radial crane rail sections and the circular crane rails;
a center tower surrounded by the first and second factory floors, wherein the center tower defines a plurality of rooms; and
at least one elevator interconnecting the first and second factory floors;
wherein the factory is configured for assembly of multiple different configurations of the aircraft, and wherein the mobile transport is selectively reconfigurable for use with each of the multiple different configurations; and
a human-machine interface device operable for generating an input signal, wherein the mobile transport is automatically reconfigured for use with one of the multiple different configurations in response to the input signal.

16. The factory of claim 15, wherein the human-machine interface device is operable for generating the input signal in response to an operator touch input.

17. The factory of claim 15, wherein the factory has twelve equally-spaced workstations on each of the first and second factory floors.

18. A factory for assembling a system from a plurality of components, the factory comprising:
at least one factory floor having a plurality of equally-spaced build stations positioned thereon;
a hub-and-spoke tool track positioned on or within the factory floor and having equally-spaced radial track sections connected to and extending radially from a circular center hub section, wherein each of the radial track sections terminates at a respective one of the build stations;
a mobile transport configured to travel along the hub-and-spoke tool track and, upon reaching a predetermined one of the build stations, to transform into one or more build tools each configured to engage and support a respective one of the components during performance of a predetermined work task;
wherein the factory is configured for assembly of multiple different configurations of the system, and wherein the mobile transport is selectively reconfigurable for use with each of the multiple different configurations of the system; and a human-machine interface device operable for generating an input signal, wherein the mobile transport is automatically reconfigured for use with one of the multiple different configurations in response to the input signal.

19. The factory of claim 18, further comprising: an overhead crane configured to move between the build stations and perform another predetermined work task at each of the build stations.

20. The factory of claim 19, wherein the overhead crane includes a plurality of radial crane rail sections connected to a concentric pair of circular crane rails, and a carriage configured to engage and translate along the radial crane rail sections and the circular crane rails.

21. The factory of claim 18, wherein the factory floor includes a first factory floor positioned below a second factory floor, and further includes a plurality of equally-spaced ramps interconnecting the first and second factory floors.

22. A factory for assembling a system from a plurality of components, the factory comprising:
- at least one factory floor having a plurality of equally-spaced build stations positioned thereon;
- a hub-and-spoke tool track positioned on or within the factory floor and having equally-spaced radial track sections connected to and extending radially from a circular center hub section, wherein each of the radial track sections terminates at a respective one of the build stations;
- a mobile transport configured to travel along the circular center hub section and the radial track sections of the hub-and-spoke tool track and, upon reaching a predetermined one of the build stations, to transform into one or more build tools each configured to engage and support a respective one of the components during performance of a predetermined work task;
- an overhead crane configured to move between the build stations and perform another predetermined work task at each of the build stations; and
- wherein the overhead crane includes a plurality of radial crane rail sections connected to a concentric pair of circular crane rails, and a carriage configured to engage and translate along the radial crane rail sections and the circular crane rails.

23. The factory of claim 22, wherein the factory is configured for assembly of multiple different configurations of the system, and wherein the mobile transport is selectively reconfigurable for use with each of the multiple different configurations of the system.

24. The factory of claim 23, further comprising: a human-machine interface device operable for generating an input signal, wherein the mobile transport is automatically reconfigured for use with one of the multiple different configurations in response to the input signal.

* * * * *